Patented Nov. 20, 1934

1,981,184

UNITED STATES PATENT OFFICE 1,981,184

TREATMENT OF LATEX

John McGavack, Leonia, and Ralph F. Tefft, Nutley, N. J., assignor to The Naugatuck Chemical Company, Naugatuck, Conn., a corporation of Connecticut No Drawing. Application March 6, 1930, Serial No. 433,808. Renewed June 29, 1933

14 Claims. (Cl. 18—50)

This case is a continuation in part of Serial No. 396,387, filed September 30, 1929.

This invention relates to the treatment of latex and particularly to a method of stabilizing the same through the agency of oxygen. It also relates to the product of such treatment.

Latex as it comes from the tree is not a very stable dispersion, and rapidly undergoes coagulation and putrefaction, unless some agent known to counteract this condition is employed. Some of the well known agents are ammonia, formaldehyde, soaps, and proteins. In general the known stabilizing agents when used in latex lower the surface tension of the latex appreciably. Some of them also, when used in latex, impart additional mineral matter to the latex.

An object of the invention is to produce a latex having increased chemical and mechanical stability. Another object is to stabilize latex with the addition of none or very little mineral matter as where the absence of metals is desired. Another object is to stabilize latex with only a slight change in the surface tension of the latex. Another object of this invention is to produce a stable latex, at the same time, decreasing the viscosity of the latex. A further object is to produce a latex which when laid down gives a film having increased tackiness and adhering properties. Other objects will be apparent from the description hereinafter set forth.

Accordingly the invention comprises putting oxygen into latex to an amount capable of stabilizing the latex. This amount has been found to vary from .02–.3% of absorbed oxygen. This may be accomplished by any number of different methods. The latex may be subjected to oxygen at any pressure as, say, from atmospheric up to 25 atmospheres, or oxygen or air may be bubbled through the latex. Instead of oxygen, or air, or ozone, hydrogen peroxide or salts which readily give up oxygen may be employed such as sodium perborate, sodium peroxide, permanganates, chromates, provided however the electro positive ions of the salts are not polyvalent since positive polyvalent ions such as calcium, aluminum, etc. tend to unstabilize the latex. The greater the oxygen pressure, the greater the concentration of the oxygen bearing salt, the longer the time and the more intimate the contact with the latex, the greater is the rate of stabilization. Heat may be used to hasten the stabilization provided it is not so excessive as to break down the natural stabilizing bodies within the latex faster or nearly as fast as the stabilizing bodies are formed by the introduction of oxygen. With ordinary conditions using oxygen at 40 to 50 lbs. pressure the reaction may be carried out at temperatures below 50° C.

If any of the methods as described above is carried out it is found that the viscosity of the latex decreases as the rate of stabilization increases and that the minimum viscosity falls at about the same point as the maximum stability. If, however, the reaction is allowed to go beyond the maximum stability the viscosity commences to rise, so one is able to follow this stabilization process by either measuring mechanical stability or the viscosity of the latex. This means that this type of stabilization is different from a colloidal standpoint, from that ordinarily obtained by the use of soaps. To produce enhanced stability by use of soaps or other materials similar to soaps a very decided lowering of the surface tension is brought about. In most cases, to obtain with soaps the stability that is brought about by our oxidation process, the surface tension would be lowered 60 or 70%. On the other hand, as was stated before, this process causes very little change in the surface tension. There is generally not more than 10 to 15% drop in this quality. This point is of interest in that it is highly desirable at times to have a stable latex where the surface tension is not lowered, as for example, where it is desired to coat fabrics or filamentary bodies without desiring penetration of the bodies. This then gives us another advantage in the use of our oxygen stabilized latex.

The following examples are illustrative of the invention and are not to be understood as limiting thereof:

*Example 1.*—A kilogram of latex is subjected to an oxygen pressure of 40 to 60 lbs. per square inch with or without agitation for a period of 2 to 8 days. The latex recovered from this process will have a mechanical stability increased from 100 to 700% of the original value, the amount being determined by the length of time of the agitation and the temperature. In the above case if the temperature is around 50° C. and the agitation is zero an increase of 700% in stability is effected in about 5 days. The amount of oxygen absorbed will be at this point approximately .04%.

*Example 2.*—Fifty gallons of an alkaline latex are treated either with oxygen or with air by simply bubbling at atmospheric pressure either of these two gases through the latex at the rate of 100 to 400 ccs. an hour. At the end of 3 to 4 weeks the latex has increased in stability anywhere from 50 to 200% or more.

*Example 3.*—100 lbs. of latex (36% total solids) containing approximately .5 lbs. of ammonia is treated with .2 of a pound of sodium perborate. This is allowed to stand over a period of several weeks during which time the stability increases gradually at first but more rapidly towards the end. At the end of two weeks the stability will increase approximately 400%. At the end of four weeks approximately 550%; at the end of six weeks approximately 700%. It is observed that when ammonia is combined with the sodium perborate that the stability of the latex is greater than when either of the materials is used alone. When ammonia (1 part by weight per 100 parts of latex) is added to the latex, and the mechanical stability determined, the stability gradually rises for a period of about 3 weeks and then is constant. At its maximum the stability is about ten minutes. .2 parts by weight of sodium perborate per 100 parts of the latex at the end of three weeks gives a constant stability of from three to four minutes. On the other hand when .2 parts by weight of the perborate plus .5 parts by weight of ammonia per 100 parts of latex are allowed to stand, the stability rises considerably more in the same three weeks and continues to rise over a longer period. The maximum stability is about forty-five minutes when using the combined materials. The latex thus obtained has the unusual property of being stable towards zinc oxide. Whereas two parts of zinc oxide will normally coagulate latex in about one to two minutes, latex containing the ammonia and sodium perborate is resistant toward coagulation from 16 to 30 minutes.

*Example 4.*—To 100 lbs. of ammonia latex ⅓ of a pound of sodium peroxide is added. The latex is allowed to stand. The stability is approximately doubled in two days and has increased itself 150% by the end of two weeks.

*Example 5.*—To 100 lbs. of latex .1 of a pound of potassium permanganate is added. The latex is allowed to stand. The stability is measured. It shows that after two days the stability is increased 20%; after one week approximately 300%; after two weeks approximately 350%.

In addition to the above advantages the latex produced by this invention will when spray dried or coagulated give a crude rubber with modified physical properties such as a higher breakdown, a higher acetone extract, and one of a more plastic type. The tackiness of the film laid down by the application of the latex can be regulated as desired depending upon the amount of oxygen used and to some extent upon the temperature employed.

That the latex produced after the methods disclosed is chemically more stable has been shown by repeated experiments. To be specific, it is known that if zinc oxide is added to a latex, especially a latex containing alkali, that the latex is greatly destabilized; for example, if to ammonia latex 1 part of zinc oxide be added and the mechanical stability determined, both prior and after the addition, it is found that the ratio of the two stabilities is 5 to 1, whereas if the same amount of zinc oxide is added to any one of the Examples 1, 2, 4 or 5 mentioned above, this ratio is cut down to approximately 7 to 6. Example 3 is unusual in that the latex may be more stable than with ammonia alone. In other words, the latex is less sensitive towards zinc oxide. In addition to this example it might be mentioned that if zinc oxide is added to normal latex that thickening occurs and the viscosity is greatly increased, whereas if zinc oxide in the same amount is added to latex, stabilized by the method described in this invention, then the viscosity is practically the same as prior to the introduction of the chemical. Other and similar types of chemical tests have been made, all of which indicate the greater chemical stability of the oxidized latex over normal latex.

By "mechanical stability" is meant the resistance to coagulation that latex offers to any form of mechanical energy or treatment such as stirring, pumping, spreading and similar operations.

With the detailed disclosure above given it will be obvious that modifications will suggest themselves and it is not desired to limit the invention otherwise than as set forth in the appended claims.

Having thus described our invention, what we claim and desire to protect by Letters Patent is:

1. A method of stabilizing latex which comprises treating latex with sodium perborate and ammonia whereby the latex is rendered highly resistant to coagulating agencies.

2. As a new product latex treated with sodium perborate and ammonia.

3. A method of stabilizing latex which comprises treating latex with alkali metal perborate.

4. As a new product latex into which has been introduced a small amount of sodium perborate.

5. As a new product latex into which has been introduced a small amount of alkali and sodium perborate.

6. As a new product latex into which has been introduced a small amount of hydrogen peroxide.

7. A method of stabilizing latex which comprises passing oxygen-containing gas through latex.

8. A method of stabilizing latex which comprises treating latex with alkali and passing oxygen-containing gas through the thus treated latex.

9. As a new product latex into which has been introduced oxygen-containing gas to stabilize the latex and provide an absorbed oxygen content of .02 to .3%.

10. Rubber comprising rubber-solids of a latex into which has been introduced a small amount of sodium perborate.

11. Rubber comprising rubber-solids of a latex into which has been introduced a small amount of a peroxide from the group consisting of hydrogen peroxide and metal peroxides free from polyvalent electro positive ions and adapted to give up oxygen to the latex.

12. Rubber comprising rubber-solids of a latex stabilized by the passage therethrough of oxygen-containing gas to provide an absorbed oxygen content of .02 to .3%.

13. A method of stabilizing latex which comprises treating latex with a peroxide from the group consisting of hydrogen peroxide and metal peroxides free from polyvalent electro positive ions.

14. As a new product latex into which has been introduced a small amount of a peroxide from the group consisting of hydrogen peroxide and metal peroxides free from polyvalent electro positive ions and adapted to give up oxygen to the latex.

JOHN McGAVACK.
RALPH F. TEFFT.